United States Patent
Kryskow, Jr. et al.

(10) Patent No.: US 8,370,169 B2
(45) Date of Patent: *Feb. 5, 2013

(54) AUTOMATED ON-LINE BUSINESS BANDWIDTH PLANNING METHODOLOGY

(76) Inventors: Joseph M. Kryskow, Jr., Hudson, NH (US); Richard E. Hudnall, Nashua, NH (US); Lowell Kopp, Winchester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/100,672

(22) Filed: May 4, 2011

(65) Prior Publication Data

US 2011/0208502 A1 Aug. 25, 2011

Related U.S. Application Data

(60) Division of application No. 10/222,190, filed on Aug. 16, 2002, which is a continuation of application No. PCT/US01/05021, filed on Feb. 16, 2001.

(60) Provisional application No. 60/183,699, filed on Feb. 18, 2000.

(51) Int. Cl.
*G06Q 10/00* (2012.01)

(52) U.S. Cl. ........................... 705/1.1; 370/252; 370/468

(58) Field of Classification Search .................. 370/252, 370/468, 395.1; 709/223; 705/1.1
See application file for complete search history.

(56) References Cited

U.S. PATENT DOCUMENTS

| | | | |
|---|---|---|---|
| 5,905,715 A | 5/1999 | Azarmi et al. | |
| 6,097,722 A | 8/2000 | Graham et al. | |
| 6,104,999 A | 8/2000 | Gilles et al. | |
| 6,154,770 A | 11/2000 | Kostakos | |
| 6,167,445 A | 12/2000 | Gai et al. | |
| 6,170,022 B1 | 1/2001 | Linville et al. | |
| 6,195,697 B1 | 2/2001 | Bowman-Amuah | |
| 6,202,094 B1 | 3/2001 | Grosser, Jr. et al. | |
| 6,690,678 B1 * | 2/2004 | Basso et al. | 370/468 |
| 6,711,137 B1 * | 3/2004 | Klassen et al. | 370/252 |
| 7,966,193 B2 * | 6/2011 | Kryskow et al. | 705/1.1 |
| 2002/0181633 A1 | 12/2002 | Trans | |
| 2003/0108223 A1 | 6/2003 | Proboski | |

OTHER PUBLICATIONS

International Search Report dated Jun. 21, 2001, International Application No. PCT/US01/05021, 4 pages.

* cited by examiner

*Primary Examiner* — James Trammell
*Assistant Examiner* — Sanjeev Malhotra

(57) ABSTRACT

Closed-loop control is applied to the field of automated on-line business bandwidth planning tools by comparing measured business bandwidth with a baseline for providing a difference indication, changing the baseline according to the difference, and reporting the change as an event relating to a service level agreement.

7 Claims, 20 Drawing Sheets

FIG. 5   TYPICAL DEPLOYMENT

FIG. 15 Master Control Module Block Diagram

Note: All buffers may be in a common buffer pool.

Master Control Module Block Diagram

AUTOMATED ON-LINE BUSINESS BANDWIDTH PLANNING METHODOLOGY

CROSS REFERENCE TO RELATED APPLICATIONS

This application is a divisional of copending application Ser. No. 10/222,190 filed on Aug. 16, 2002 which is a continuation of International Application No. PCT/US01/05021 having an international filing date of Feb. 16, 2001, and from which priority is claimed under all applicable sections of Title 35 of the United States Code including, but not limited to, Sections 120, 363 and 365(c), and which in turn claims priority under 35 USC §119(e) to U.S. Provisional Patent Application Ser. No. 60/183,699 filed on Feb. 18, 2000.

The present application discloses subject matter which is disclosed and may be claimed in the following international applications as identified by (PCT/US01/05119), (PCT/US01/05120), (PCT/US01/04876) and (PCT/US01/04873) and which are hereby incorporated by reference.

Application No. PCT/US01/05119 is directed to a closed loop method for baselining business bandwidth in a network environment.

Application No. PCT/US01/05120 is directed to analysis of business bandwidth for control of same.

Application No. PCT/US01/04876 is directed to the application of closed loop control to control of business bandwidth.

Application No. PCT/US01/04873 is an extension of PCT/US01/05119, PCT/US01/05021, PCT/US01/05120 and PCT/US01/04876 with respect to exportation of information in a multiple management environment (multiple users with different SLAs).

BACKGROUND OF THE INVENTION

1. Technical Field

This invention applies closed-loop control methodologies to the field of automated on-line business bandwidth planning tools.

2. Discussion of Related Art

Simply stated, the current rate of change in business bandwidth management is getting out of control. IT business owners and service providers are struggling to manage business systems. Transport of data is exploding at unbelievable growth rates and some service providers are straining at full capacity. Even though data from multimedia networks is still a relatively small proportion of the whole, this is expected to change in the near future. The performance of these streaming protocols is not visible to network probes and sniffers. Service providers and business managers mistrust each other due to the stressful environment. Most service provider contracts are now mandating service level agreements (SLAs) to try to get a mechanism in place to enforce what is promised versus what is delivered Business managers are contemplating increasing their out sourcing due to the need for outside assistance in managing their networks and therefore new dynamic services are needed. Furthermore, in view of the fact that dynamic routing and the impending internet to "virtual" services model will obsolete current modeling and planning tools new solutions are needed.

SUMMARY OF INVENTION

An object of the present invention is to provide an automated on-line business bandwidth planning methodology.

Another object of the present invention is to apply closed-loop control methodologies to the field of automated on-line business bandwidth planning tools.

According to a first aspect of the present invention, a method for use in a network for providing an indication of an actual service level relating to business bandwidth provided in said network according to a service level agreement comprises the steps of measuring a business bandwidth parameter, comparing the measured business bandwidth parameter with a baseline for the parameter for providing a change signal indicative of a change in the business bandwidth parameter, and changing the baseline for the parameter according to the change signal. The method may further comprise the step of recording the change in the baseline for use in reporting a compliance level or non-compliance level within or without the service level agreement. The step of measuring may be carried out by means of passive monitoring of data flow or by introducing data into the network for determining an effect on the step of changing the baseline. Such may also be reported.

According to a second aspect of the present invention, a method for bandwidth management comprises the steps of measuring a parameter relating to business bandwidth and providing a current bandwidth parameter signal having a magnitude indicative thereof, comparing the current bandwidth parameter signal with a baseline signal for providing a difference signal, analyzing the difference signal for modifying the baseline signal. Instead of directly modifying the baseline signal in response to the difference signal, a results notification signal may be provided in response to the difference signal for providing a learning feedback signal, wherein the validation signal is provided in response to the results notification signal.

These planning tools will be used to help both business bandwidth network users and network providers manage and control the growth and high rate of change of business bandwidth. These tools enable automatic planning tools by combining highly accurate monitoring tools and automatic bandwidth simulation tools into a single planning tool framework. The addition of auto characterization and auto partitioning methodologies allows the user to simulate the effects of changes in business bandwidth, then run a real-world test to validate that simulation.

BRIEF DESCRIPTION OF THE DRAWINGS

FIG. 6 shows a four-port SLA module such as shown in. FIG. 5, according to the present invention.

BEST MODE FOR CARRYING OUT THE INVENTION

Figure 1:
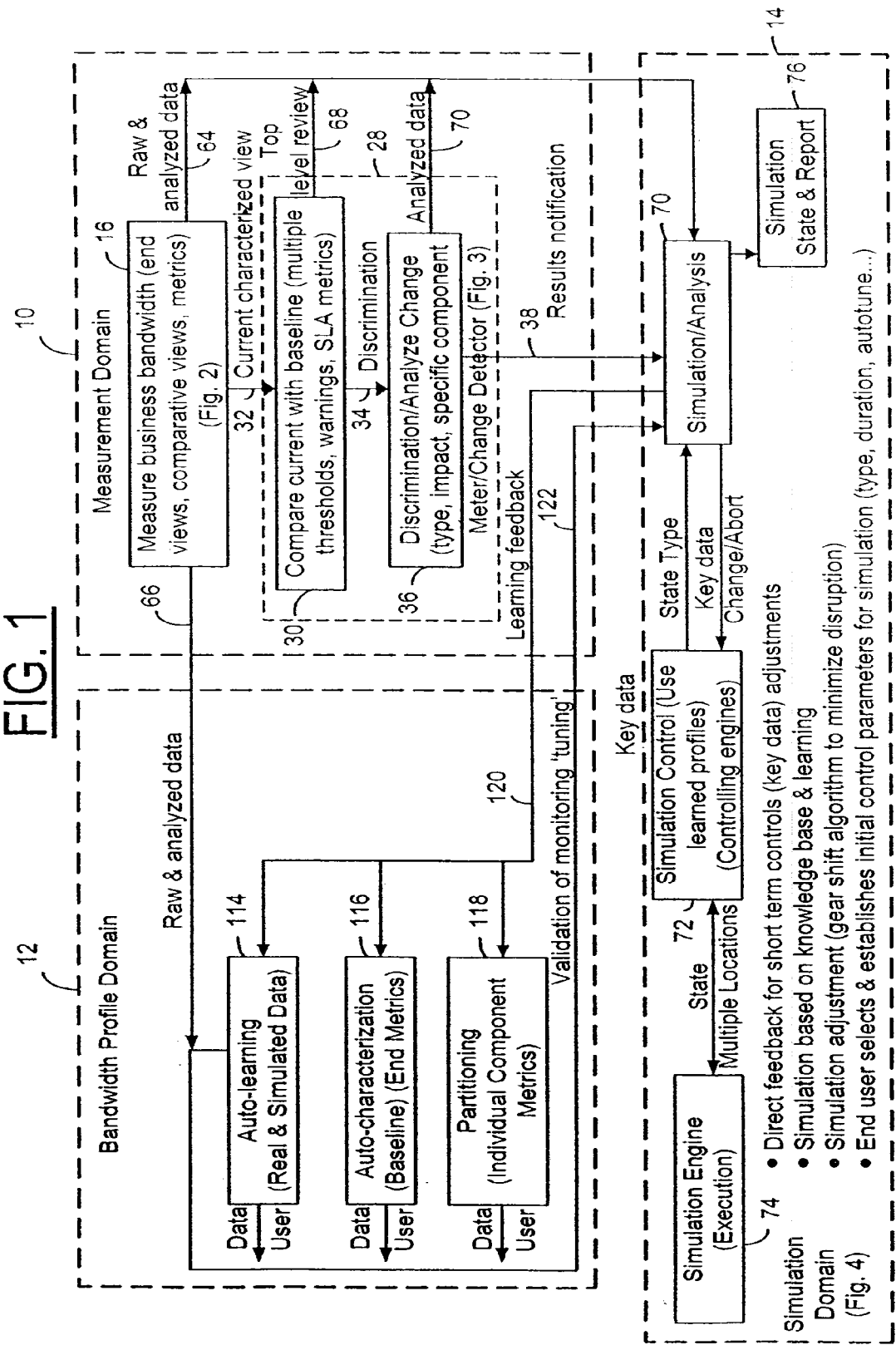
FIG. 1 shows a closed loop methodology for business bandwidth management, according to the present invention.
Figure 2:
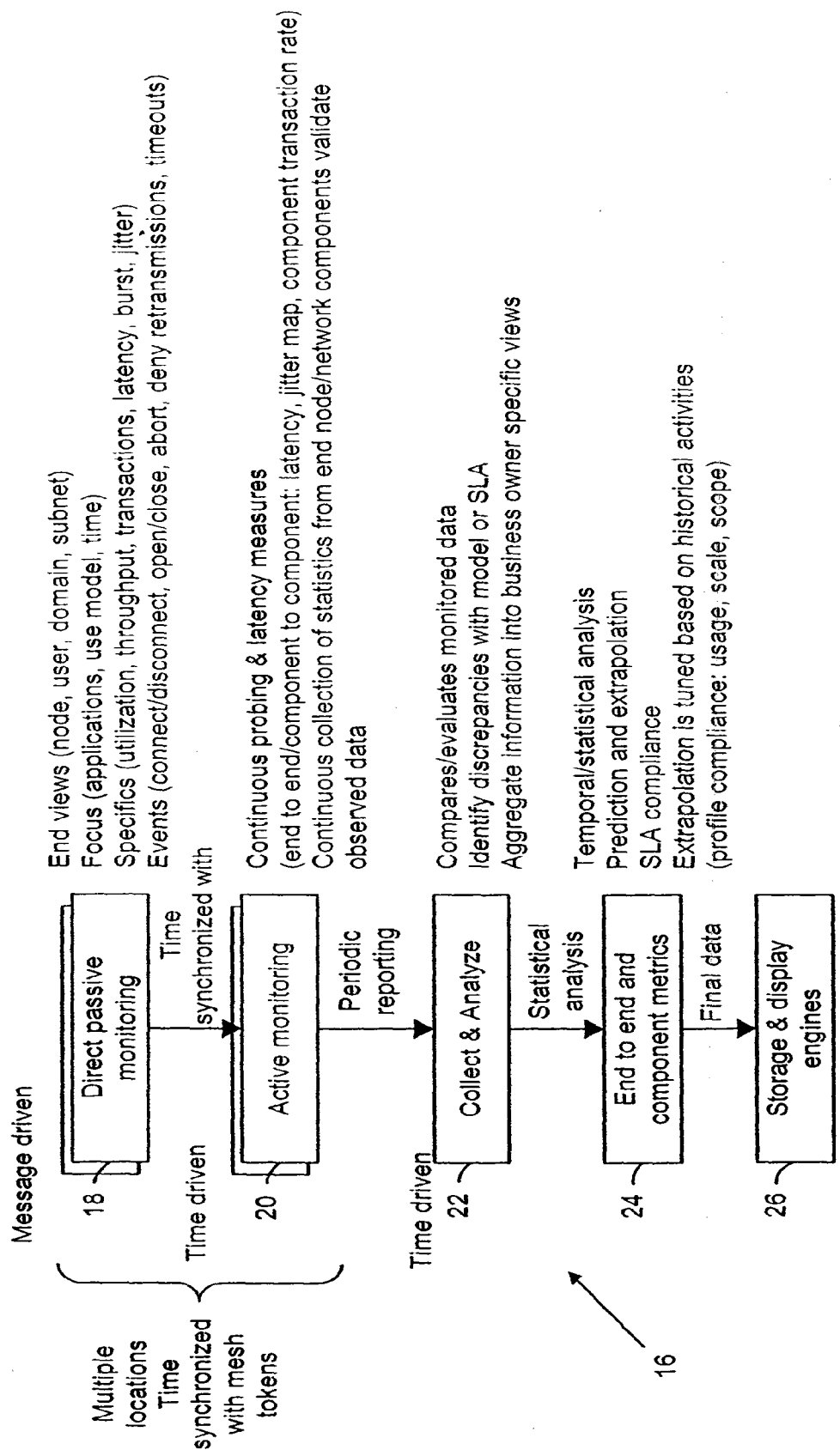
FIG. 2 shows further details of business bandwidth measurements, according to the present invention as shown in FIG. 1.
Figure 3:
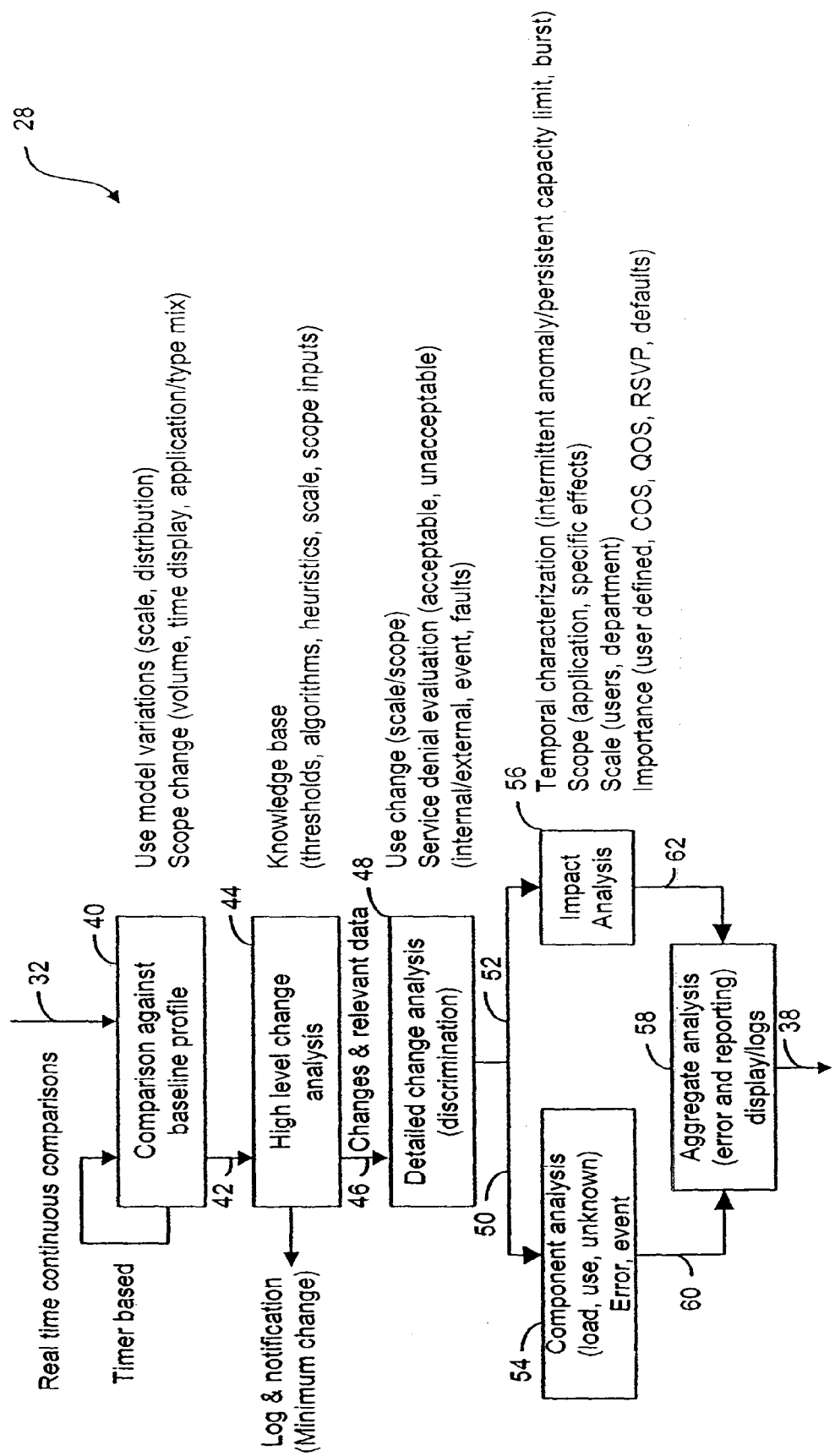
FIG. 3 shows further details of business bandwidth metering/change detection, according to the present invention as shown in FIG. 1.
Figure 4:
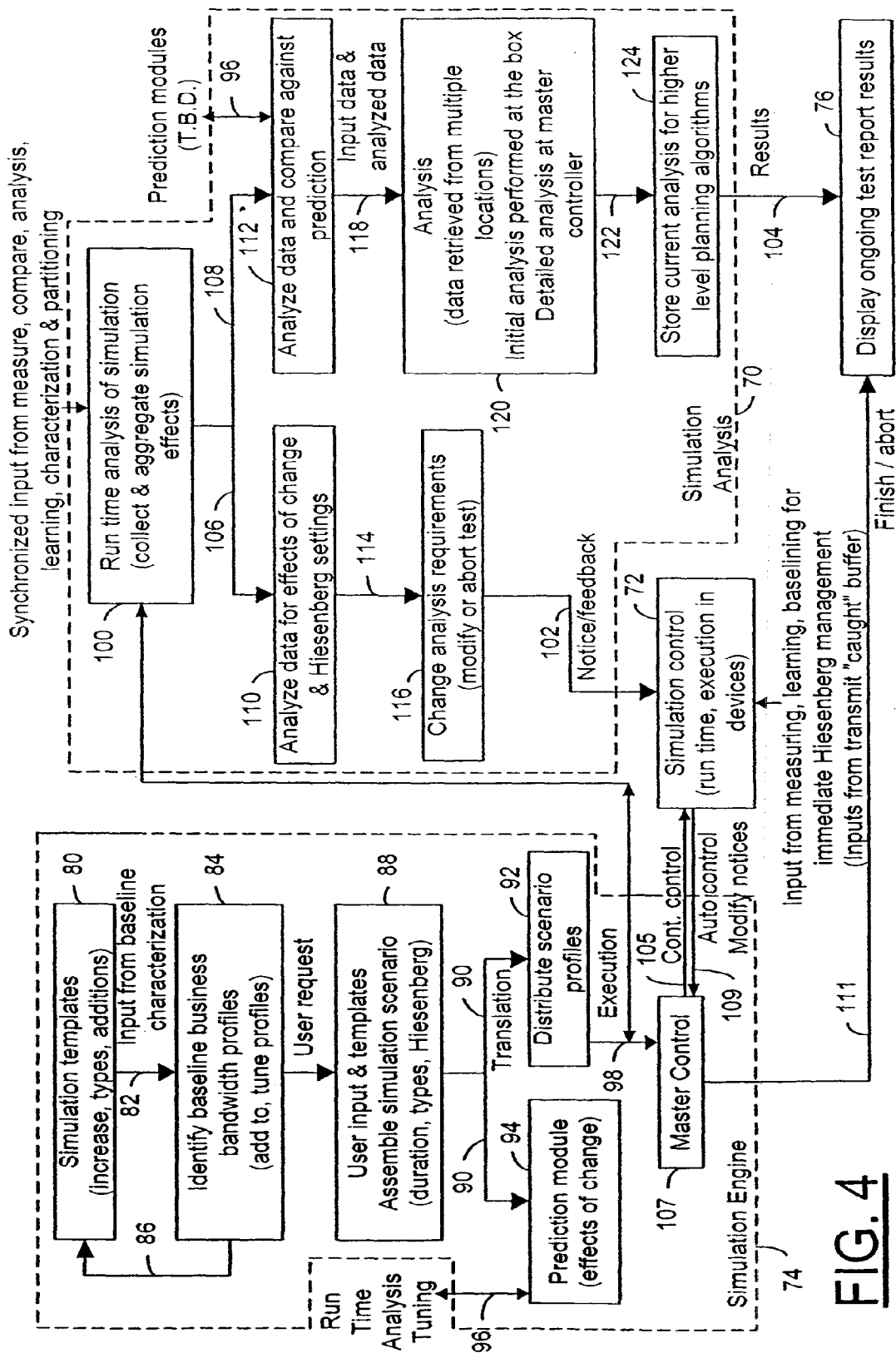
FIG. 4 shows further details of simulation methods, according to the present invention as shown in FIG. 1.

The specific components that make up the closed-loop methodology for planning and managing changes to business bandwidth are (1) business bandwidth measurements according to FIG. 2, and comparison of current bandwidth characters against baseline profiles according to FIG. 3. Simulation methods according to FIG. 4 may be combined to form a closed loop methodology for business bandwidth management according to FIG. 1.

Referring first to FIG. 1, the closed loop methodology for business bandwidth management includes a measurement domain 10 and a bandwidth profile domain 12 in combination. A simulation domain may be added to the combination. Further details of the measurement and simulation domains are provided in copending International Application Number PCT/US01/04876 entitled "Auto Control of Monitoring and Simulation" filed on even date herewith.

Figure 5:
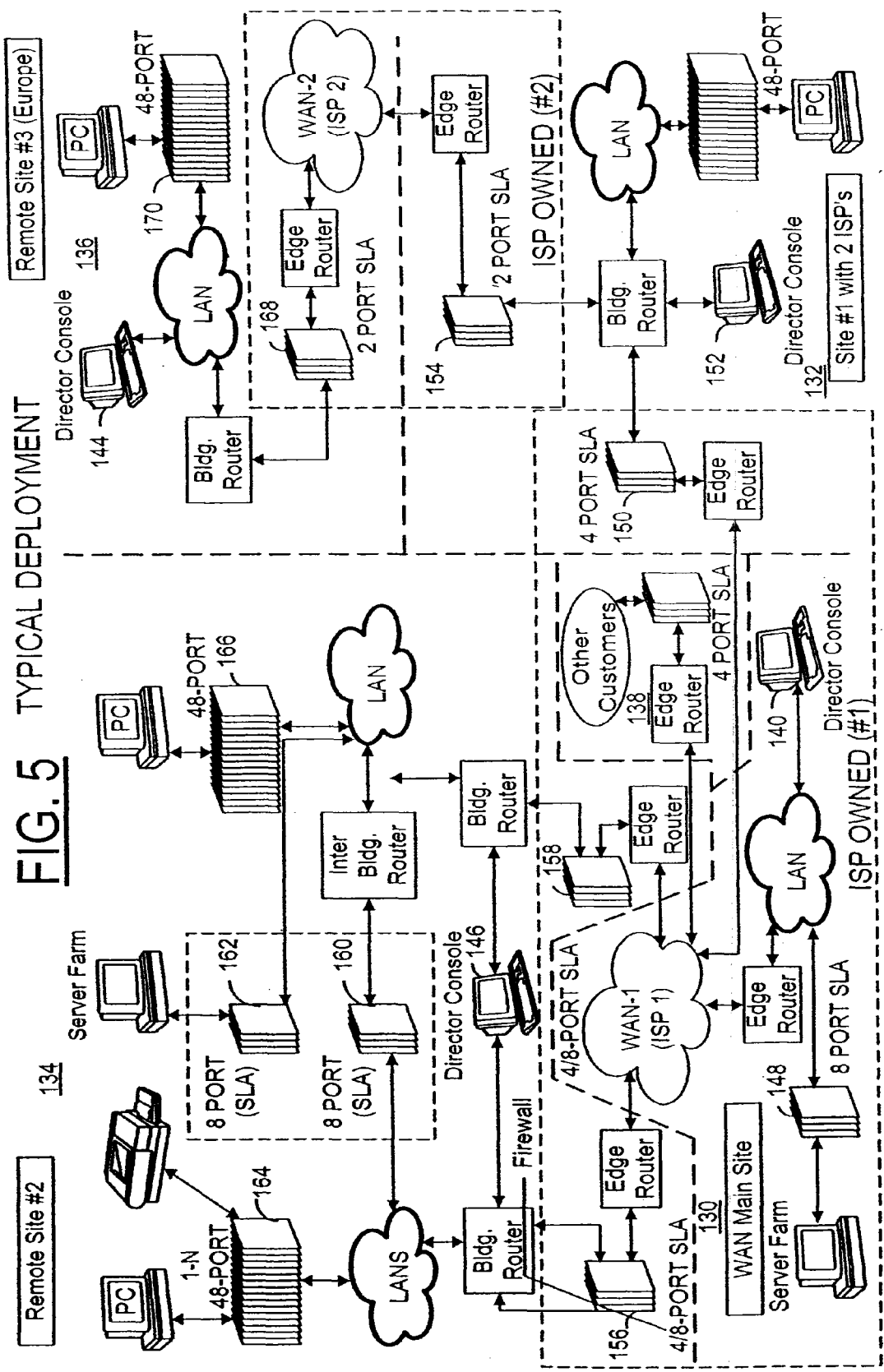
FIG. 5 shows a typical deployment of the present invention for use over a wide geographical area including a main site and various remote sites.
Figure 6:
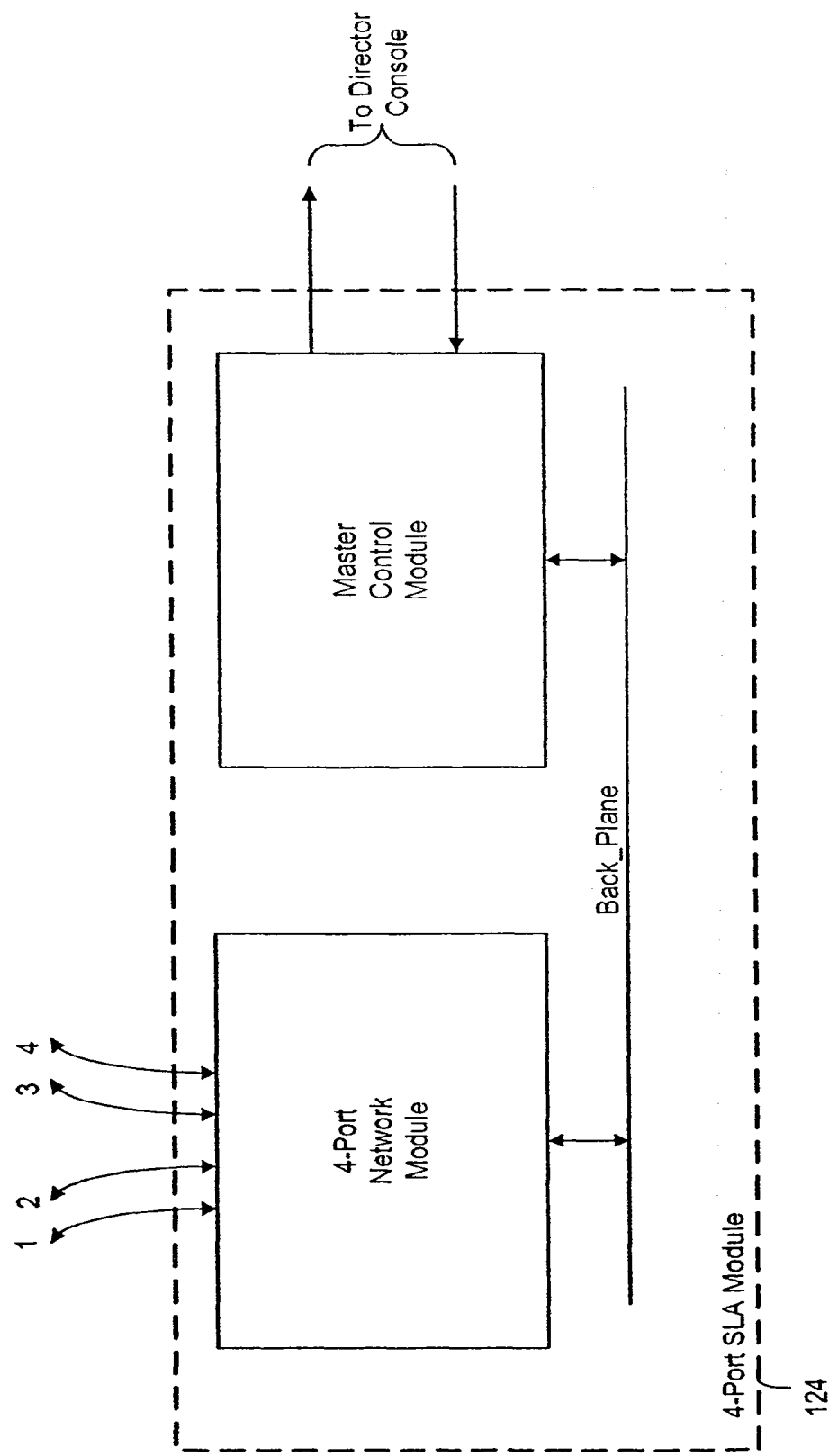
Figure 7:
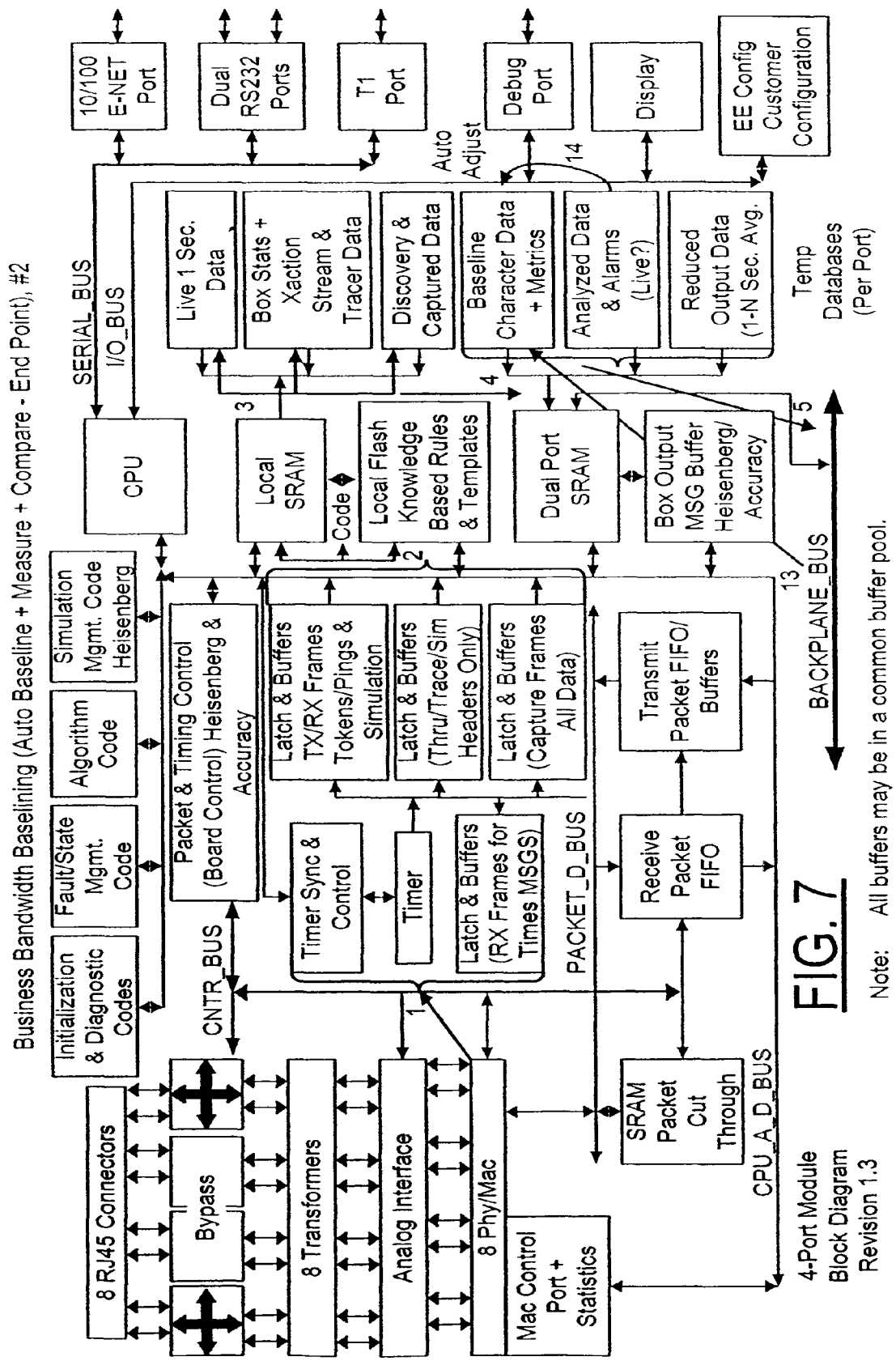
FIG. 7 shows a block diagram of the four-port network module of the four-port SLA module of FIG. 6.
Figure 8:
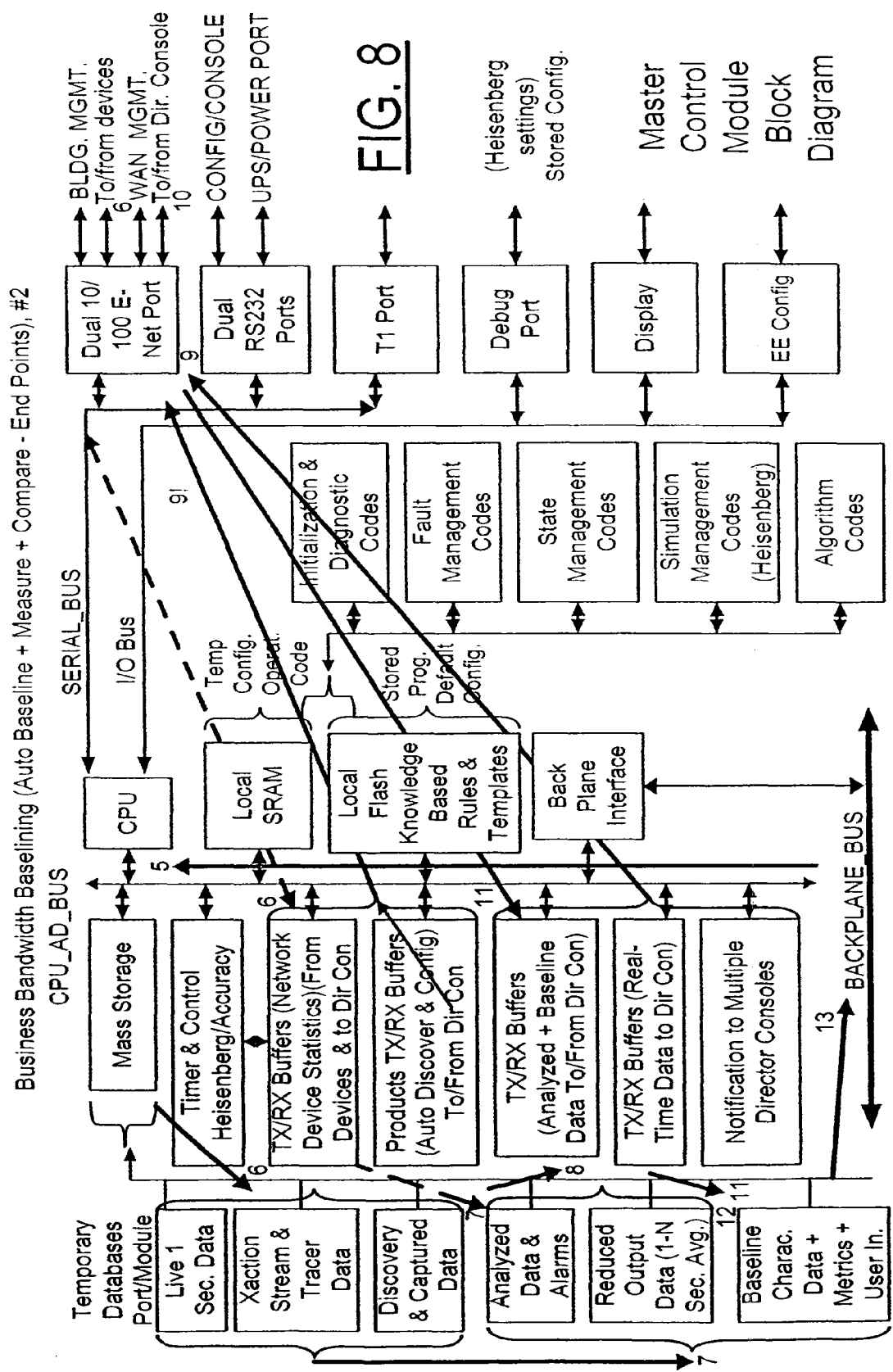
FIG. 8 shows a block diagram of the master control module of the four port SLA module of FIG. 6.

Referring first to the measurement domain 10, it includes business bandwidth measurements 16 shown in more detail in FIG. 2. The business bandwidth measurements of FIG. 2 are for accurately measuring "current" business bandwidth data (analyzed/translated into specific metrics) from multiple end/component views as shown in steps 18, 20 of FIG. 2. The more accurately a network can be measured or observed, the more accurately can it be evaluated for the impact of changes to that network. The measures combine passive monitoring capabilities 18 (observe data flowing thru) and active monitoring (transaction and [token ring] stream latency measures) 20 with statistics collected from key end nodes and components. The gathering and synchronous analysis of this information as shown in steps 22, 24, 26 creates a highly accurate measurement of business bandwidth. FIG. 6 and the 4-Port Service Level Agreement (SLA) Module Block Diagrams of FIGS. 7 and 8 provide further details. This hardware can be deployed as shown in FIG. 5, for example, for use in conjunction with a director console. FIG. 7 shows a 4-port network module that is for instance for connection to an enterprise network. FIG. 8 shows a master control module for connection to a Director Console and that communicates with the 4-port network module over a back plane. Together they make up the 4-port SLA module as shown in FIG. 6 and to be described more fully below after first describing FIGS. 1-4.

Referring back to FIG. 1, a block 28 is shown within the measurement domain 10 for carrying out a comparison of current bandwidth characteristics as measured in the block 16, against baseline profiles. The block 28 can be viewed as a "bandwidth meter/change detector". As shown in a block 30, the current characterized view as provided on a line 32 from the block 16, is compared with a baseline which may include multiple thresholds, warnings and SLA metrics, for instance. Discrimination indications are provided from block 30 on a line 34 for analysis in a block 36. Discrimination and change analysis is carried out as per type, impact, specific component, or the like and a results notification is provided on a line 38 from the measurement domain to the simulation domain 14. Referring to FIG. 3, the bandwidth meter/change detector 28 of FIG. 1 is shown in more detail. A block 40 is for comparing in real time the current characterized view on the line 32, i.e., the accurately monitored business bandwidth and data/analyzed metrics with the baseline characterization/metrics. This allows the system to quickly detect changes in the business bandwidth. These changes are signaled on a line 42 and can then be put through multiple levels of discrimination/change analysis. A high level change analysis 44 uses embedded knowledge-based algorithms utilizing tuned parameters to match the customer environment. The change "engines" identify whether the change is minimal (requires additional new data) for logging and notification or that the change is significant enough to affect specific applications as signaled on a line 46. Additionally a detailed change analysis "engine" 48 identifies whether the change is acceptable (consistent with SLA's) or unacceptable. Specific change qualifications are:

Needs/use change (scale/scope); or

Service denial (specific error/event of application); or

Bandwidth denial (capacity/flow control) (errors/events); or

Specific component that is causing change and why

This detailed change analysis is signaled on lines 50, 52 for purposes of component analysis 54 and impact analysis 56. It should be noted that the components analyzed are for any end point, end-to-end and component-to-component. In addition, distinguishing/monitoring both user application and simulated data allows a finer granularity of control/analysis of the simulation to be carried out in the simulation domain described in FIG. 4. An aggregate analysis 58 is responsive to the component analysis signaled on a line 60 and the impact analysis signaled on a line 62 for aggregating the analyses for results notification including error and reporting on the line 38 of FIG. 1.

Referring back to FIG. 1, it should be mentioned that the measurement domain provides other signaling besides the results notification 38, i.e., to the bandwidth profile domain 12 and the simulation domain 14. For instance, raw and analyzed data on a line 64 and on a line 66 are provided to the simulation domain 14 and bandwidth profile domain 12, respectively. Similarly, a top level review signal on a line 68 and an analyzed data signal on a line 70 are provided to the simulation domain as shown in FIG. 1.

Referring now to the simulation domain 14 of FIG. 1, a highly interactive suite of simulation tools are provided, according to the present invention, to allow the user to simulate (and monitor the effects of) increased capacity (increase in business bandwidth utilization). The simulation domain 14 includes simulation analysis 70, simulation control 72, simulation engine 74, and a simulation state and report blocks 76. These are shown in more detail in FIG. 4. The simulation engine 74 includes a set of simulation templates/profiles 80 for each type of business bandwidth (modifiable by scale/scope/priority). This baseline characterization is provided on a line 82 to means 84 for identifying the baseline business bandwidth profiles and for adding thereto or tuning these profiles. Such additions or tuning are provided on a line 86 to the simulation templates 80. This automatic tuning/modifying (or adding to) of the profiles may be based on highly accurate measures of those applications running in the network (characterization metrics of business bandwidth) Users can tailor/tune the simulation profiles with user requests based on individual extensibility goals as shown in a block 88. The new profiles are assembled into a controllable/adjustable simulation profile:

Increasing overall traffic by "x %" (temporally to same sources/sinks)

Increasing specific application traffic (same sources/sinks) by "x %".

Adding new sources/sinks (applications) and increasing traffic by "x %".

Distributing on a line 90 this profile to multiple simulation engines 92 and synchronizing/controlling their executions.

A prediction module 94 exchanges information with the simulation analysis block 70 on a line 96.

Referring to the simulation analysis 70, it is also responsive to the scenario profiles distributed on a line 98 to a run time analysis simulation block 100. This block is also responsive to the various inputs shown in FIG. 1 from the measurement domain 10) and from the bandwidth profile domain 12. These accurate measurements are provided while running the simulation analysis 70 and observing both the business bandwidth characteristics and the simulated data characteristics; e.g., measuring and analyzing the effects of the simulation on other bandwidth and the effects of the network's capacity handling (any end and any component) on the simulation. While running the simulation on line, the invention provides for monitoring feedback control methods that can "attempt" to minimize the negative impacts on actual applications (minimize impact on critical SLA metrics-end to end and components). The simulation analysis collects simulation results and gives a continuously updated run time view on a line 102 as well as a finished test result on a line 104. The finished test result is then analyzed by additional planning modules in the block 76 that make network bandwidth SLA change recommendations, including price/performance tradeoffs of changing one or more component SLA's.

Referring back to the run time analysis 100, the collected and aggregated simulation effects are provided on lines 106, 108 to analysis blocks 110, 112. The analysis block 110 analyzes the data for the effects of the change and provides an output effect signal on a line 114 to a change analysis block 116 which analyzes the change requirements to determine whether to modify or abort the test. It provides the notice/feedback signal on the line 102 to the simulation control 72.

The analysis block 112 analyzes the data provided on the line 108 and compares it against a prediction provided on the line 96 from prediction module 94 in the simulation engine. It provides an input data and analyzed data output signal on a line 118 to an analysis block 120 in which data is retrieved from multiple locations and an initial analysis is performed.

The simulation control 72 is responsive to the notice/feedback signal on the line 102 as well as the inputs from measuring, learning and baselining and is responsive to the execution signal on the line 98 and a CLNT control signal on a line 106 from a master control 108. In response, the simulation control sends auto control modify notices on a line 110 to the master control 108. The master control 108 is also responsive to the execution signal on the line 98 and provides a finish/abort signal on a line 112 which is used in the block 76 to display the ongoing test report results.

Referring back to the Bandwidth Profile domain 12 of FIG. 1, there is shown modifying/tuning the embedded auto learning 114, baselining 116, and partitioning 118 knowledge-based algorithms (AI) by observing the effects of the simulation on those automatic functions; e.g., knowing the simulation and the effects of the simulation, the algorithms can be tuned to better characterize end-to-end and component metrics The blocks 114, 116, 118 are responsive to learning feedback on a line 120 from the simulation analysis 70 for providing a validation of monitoring "tuning" signal on a line 122 to both the simulation control 72 and analysis 70. These functions are further described in co-owned, copending application filed on even date herewith.

FIG. 5 shows a typical deployment of the present invention for use over a wide geographical area including a main site 130, a first remote site 132, a second remote site 134, and a third remote site 136 Other sites are indicated at 138 The basic building blocks comprise various director consoles 140, 142, 144, 146 and a plurality of n-port SLA modules 148, 150, 152, 154, 156, 158, 160, 162, 164, 166, 168, and 170 shown in the example for instance as 2, 4, 8, or 48 port SLA modules. The n-port SLA modules are used to measure and preprocess the collected data and to communicate the monitored data to the director consoles. The director consoles are in control of the n-port SLA modules and together with the modules are used to carry out the present invention. The n-port SLA modules are shown connected to various user equipments and to local area networks for communication with the director consoles through building routers, interbuilding routers, and wide area networks served by various ISPs. A service level agreement between an ISP and the main site for instance will include various baseline parameters relating to different types of traffic such as voice, video, transaction data or data base queries. It is in the interest of both the business owner deploying at the main site 130 and the remote sites 132, 134, 136 and the ISP or ISPs to manage the transport of data between the main site and the remote sites in such a way that the performance is visible and the environment can become one of trust. This can be accomplished according to the present invention by deploying a plurality of n-port SLA modules as shown for measuring, changing and reporting business bandwidth usage to either the enterprise owner, the ISP or both. An independent service would be more effective in this regard since the trust level will be higher if the measurements and reporting is carried out by an independent operator. However, it should be understood that the present invention is operable by an ISP by itself or by the enterprise by itself.

FIG. 6 shows a four-port SLA module, according to the present invention. It comprises a four-port network module connected to a master control module over a back plane. The master control module in the present architecture communicates with the director console over a serial bus connected to an ethernet port. FIG. 7 shows a block diagram of the four-port network module of FIG. 6. It shows some of the components used for business bandwidth baselining in particular including automatic baseline, measuring and comparing. FIG. 8 shows a block diagram of the master control module of the four-port SLA module of FIG. 6. It should be viewed in conjunction with FIG. 7 for purposes of completing the business bandwidth baselining function.

Figure 9:
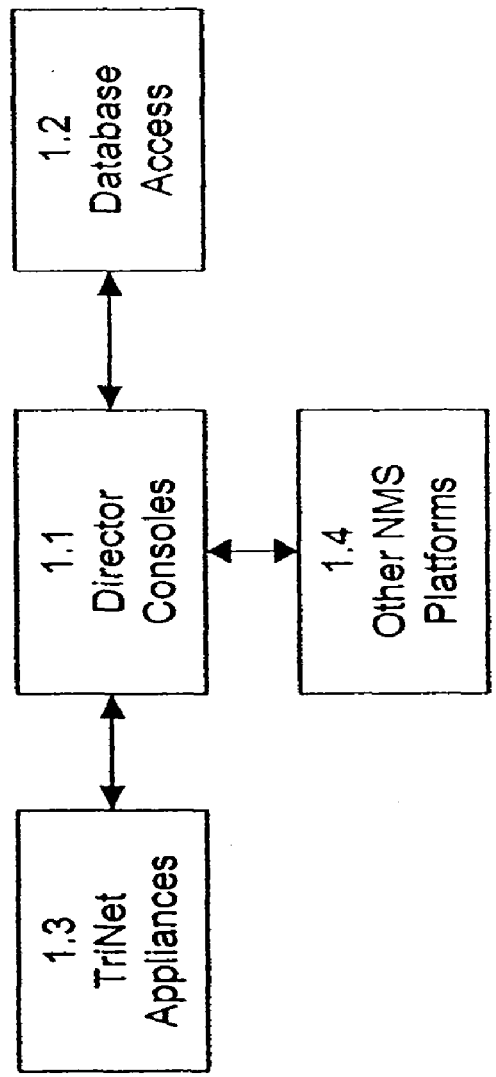
FIG. 9 shows a block diagram of a director console, such as shown in FIG. 5, according to the present invention.

FIG. 9 shows a director console architecture with particular applicability to simulation and monitoring planning modules. Each of the n-port SLA modules of FIG. 6 discovers the director console and the director console discovers each n-port SLA module. The discovery process may be through-broadcast or multicast messages. Whenever a new n-port SLA module is added to the enterprise network, the director console and the n-port SLA module (appliance) are able to discover each other and start communicating for proper operation. Communications between the director console and the SLA module can be accomplished in various modes including a first mode including request-response mode or pull mode or a second mode including publish-subscribe mode or push mode. In the request-response mode (pull mode) the director console requests and the SLA module responds. This requires a round trip and is a more expensive operation. This mode is primarily used for control messages and defines the behavior of the appliances. The publish-subscribe mode (push mode) is used with this director console subscribing to interested data at specified intervals and/or under certain conditions wherein the SLA modules send the data to the director console through UDP messages. Since these messages are one-way UDP messages, the additional traffic on the network is minimized. For efficiency, connectionless UDP based short messages may be used for frequent data exchange with TCP based messages used for infrequent bulk transfers.

As more SLA modules are added to the system, the director console receiving the traffic from the SLA modules may become overloaded. To avoid this, the overloaded director clones itself into two or more instances and becomes the parent of the clones. The SLA modules communicating with the parent console will be directed to communicate with the clones. The parent distributes the SLA modules evenly to the cloned directors.

The directors are symmetrical meaning that one can act as a parent or a child. The input and output streams may have identical format and each director console may require its own instances of some data bases.

This mechanism requires a set of available systems and a means of starting the director console which takes a given state information to carry on the needed task. The newly started director consoles will assume the initiating DC as the parent.

Figure 10:
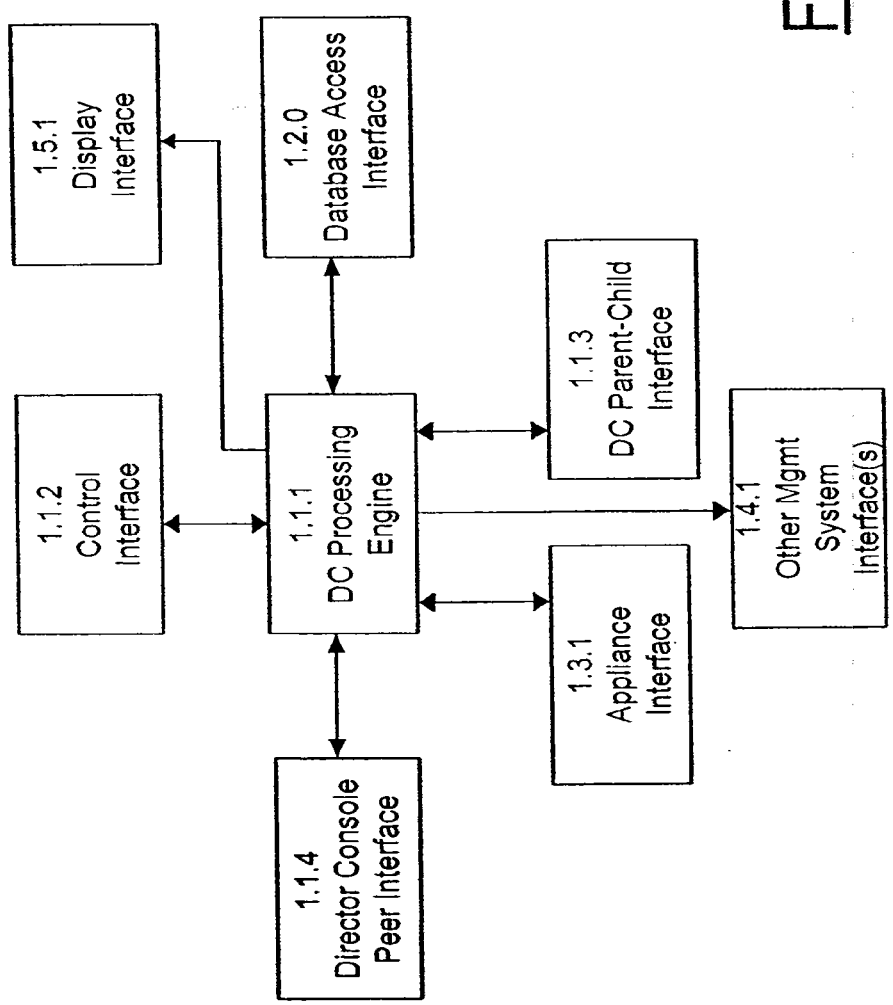
FIG. 10 is a block diagram of director console interfaces for the director console of FIG. 9, according to the present invention.

FIG. 10 is a block diagram of director console interfaces for the director console of FIG. 9. Note that the parent-child and SLA module interfaces are identical.

Figure 11:
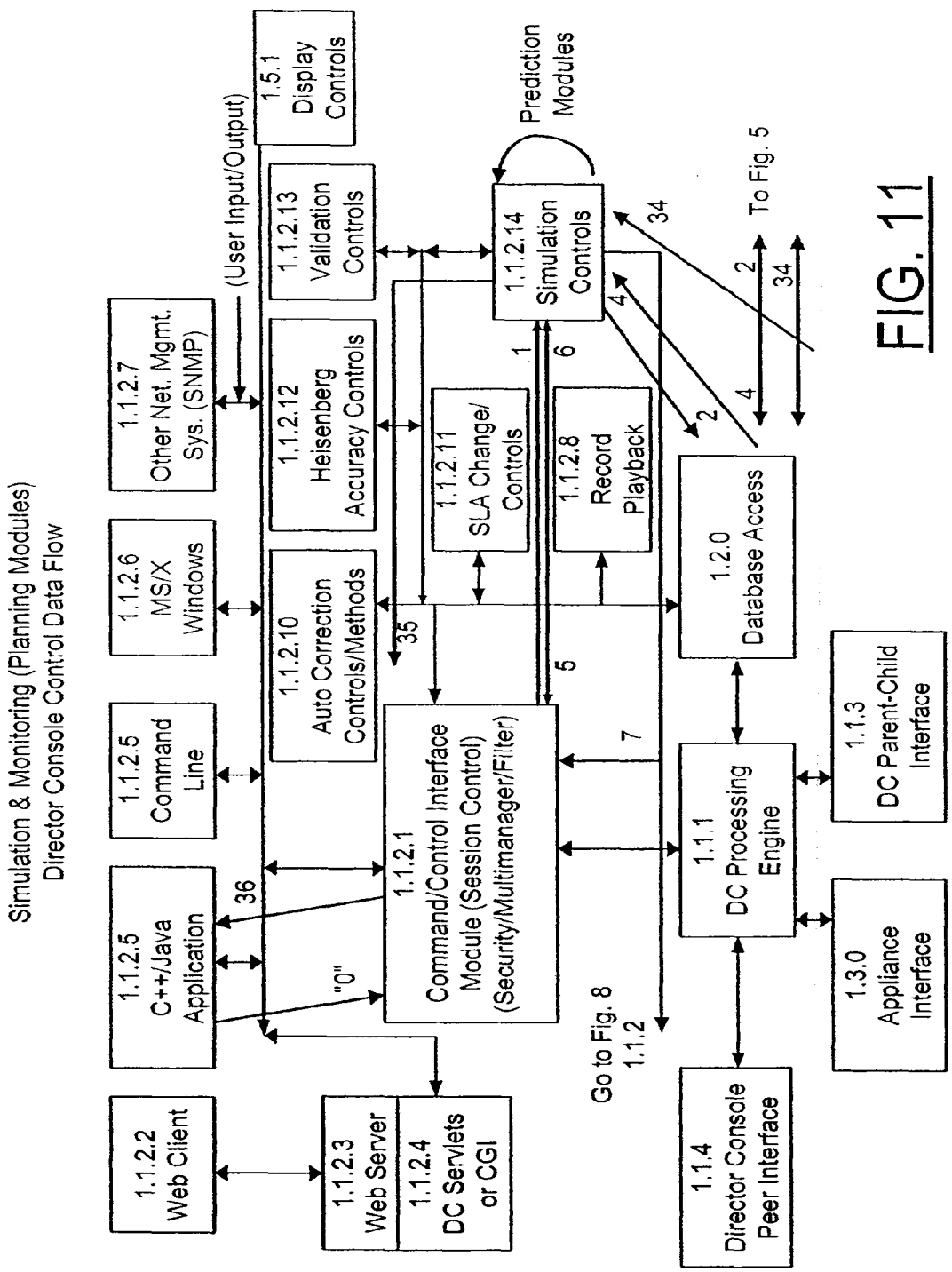
FIG. 11 is a block diagram of director console control data flow for the director console of FIG. 9, according to the present invention.
Figure 12:
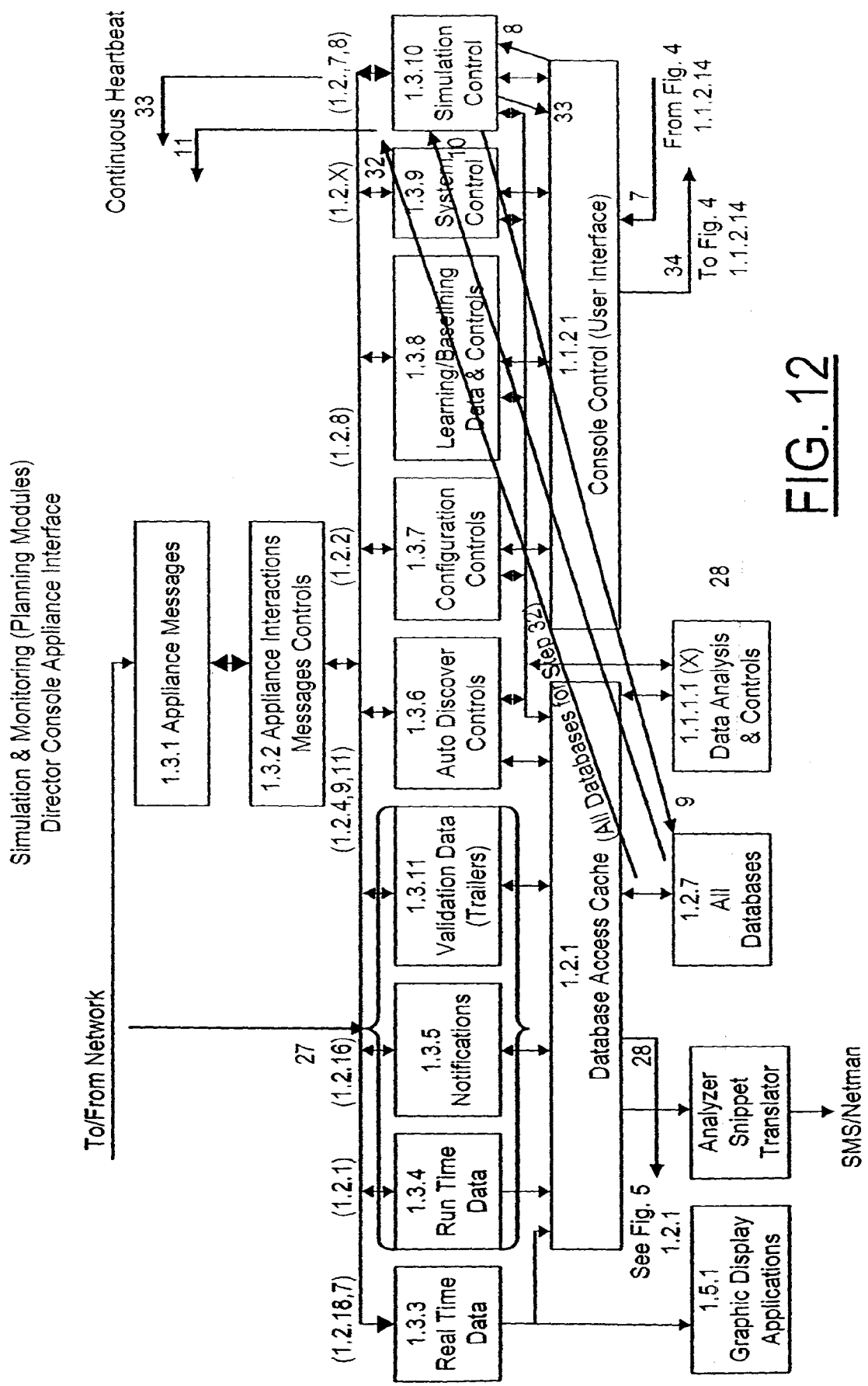
FIG. 12 is a block diagram of director console appliance interfaces for the director console of FIG. 9, according to the present invention.
Figure 13:
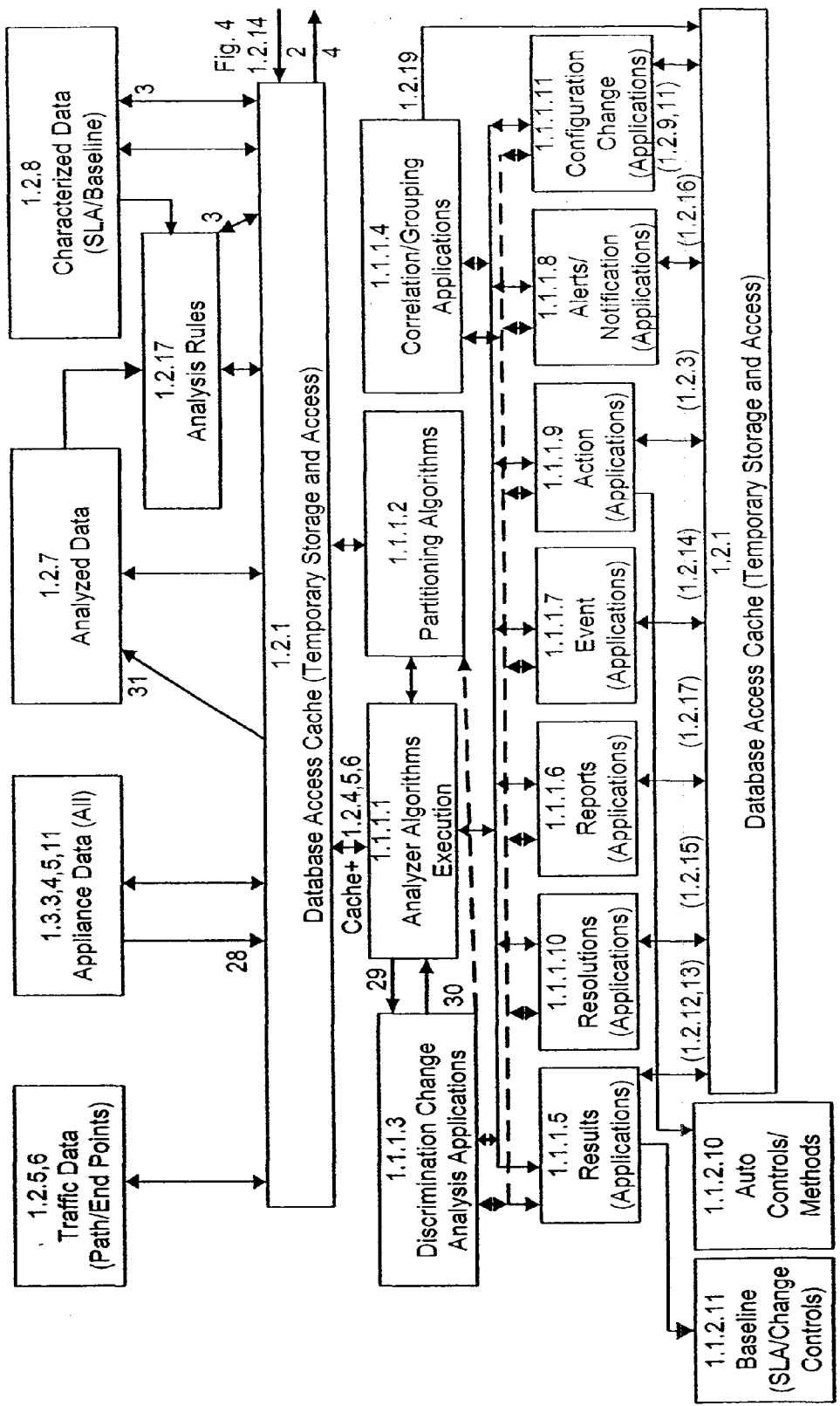
FIG. 13 is a block diagram of data base analysis, according to the present invention.
Figure 14:
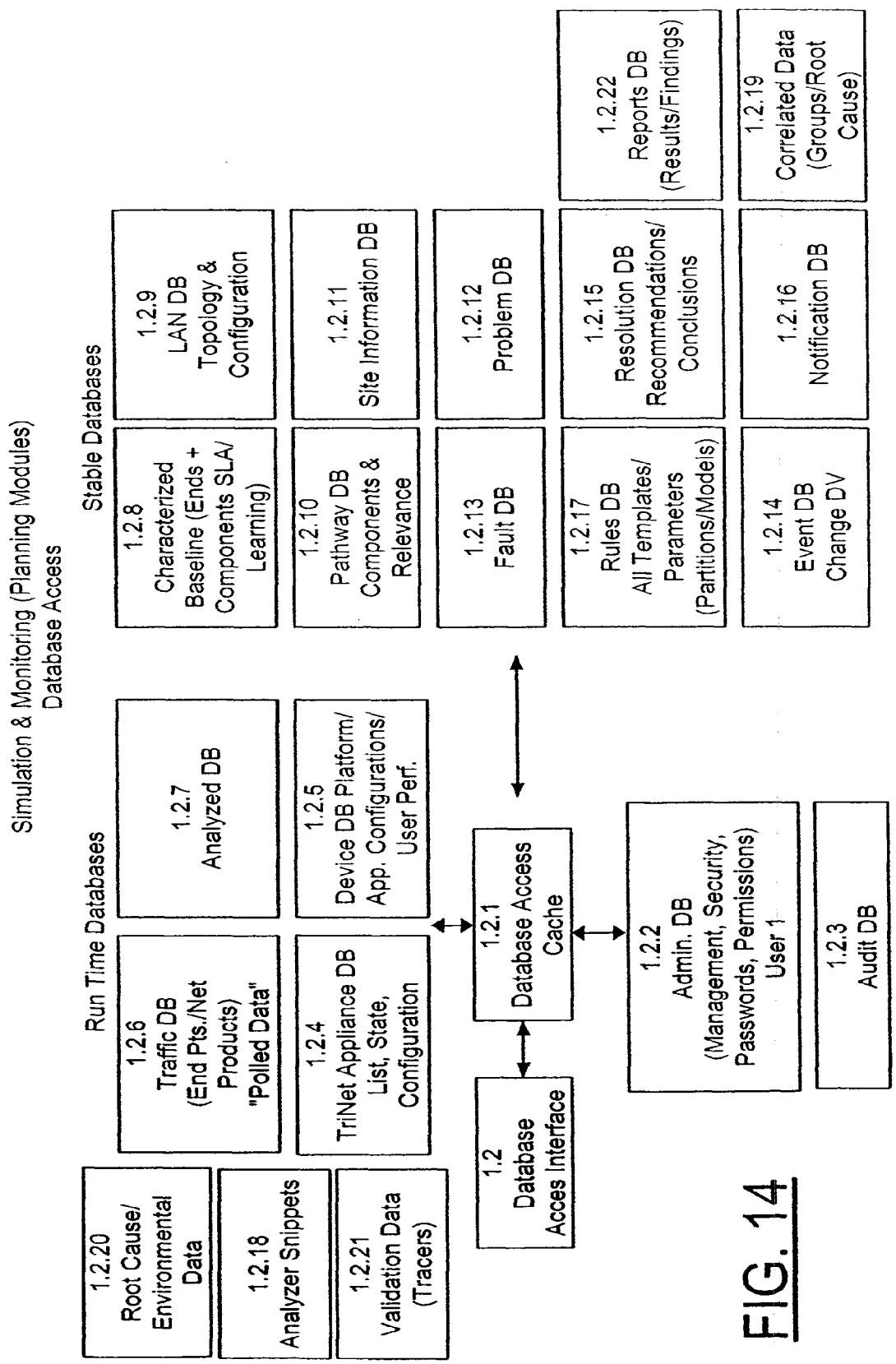
FIG. 14 is a block diagram of data base access, according to the present invention.

FIG. 11 is a block diagram of director console control data flow for the director console of FIG. 9. FIG. 12 is a block diagram of director console appliance interfaces for the director console of FIG. 9. FIG. 13 is a block diagram of data base analysis for the director console of FIG. 9. FIG. 14 is a block diagram of data base access for the director console of FIG. 9.

Figure 15:
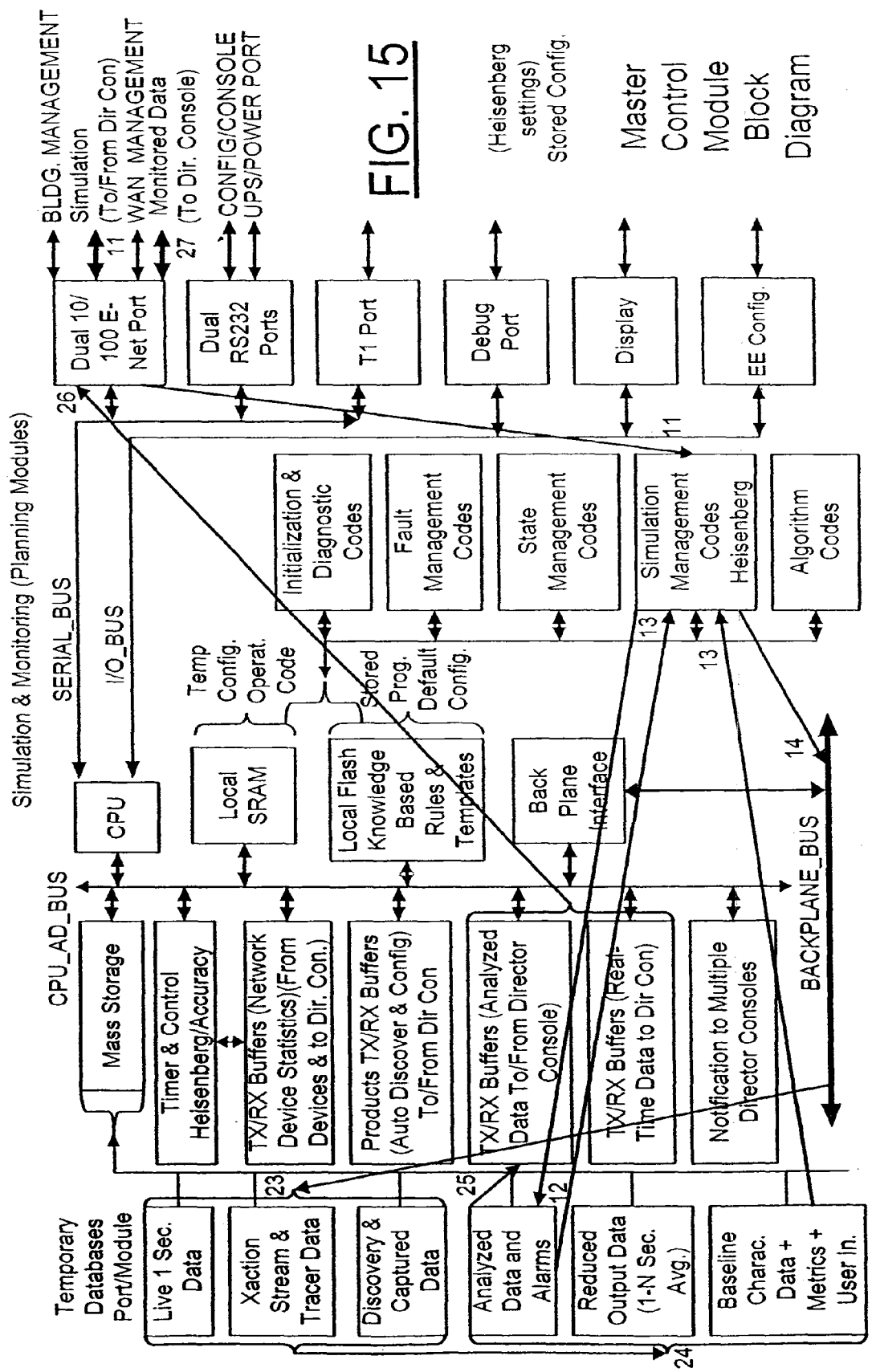
FIG. 15 is a block diagram of planning modules including simulation and monitoring in the master control module, according to the present invention.
Figure 16:
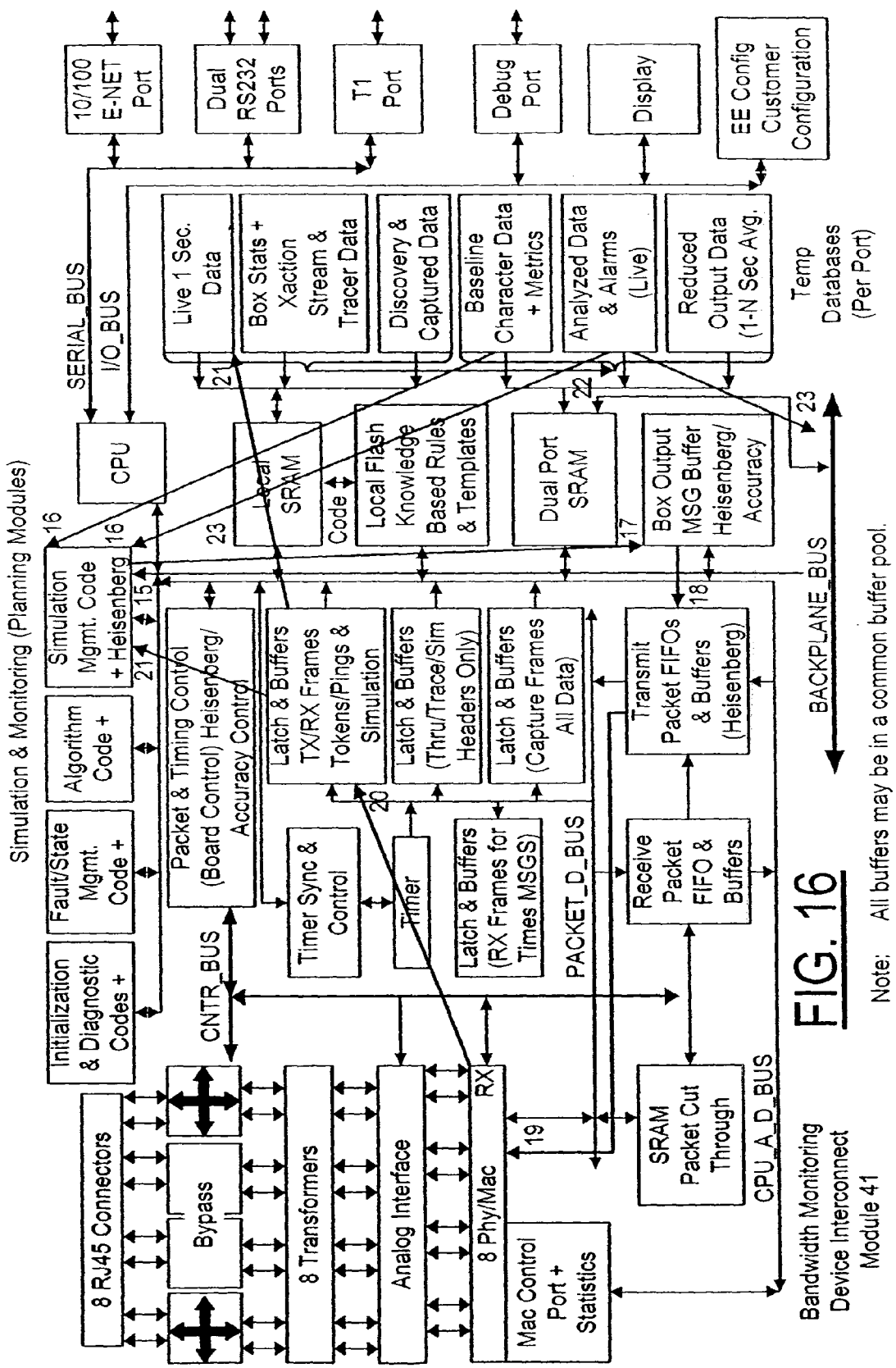
FIG. 16 is a block diagram of the four-port module of FIG. 7 illustrating planning modules including simulation and monitoring used in conjunction with the master control module of FIG. 9.
Figure 17:
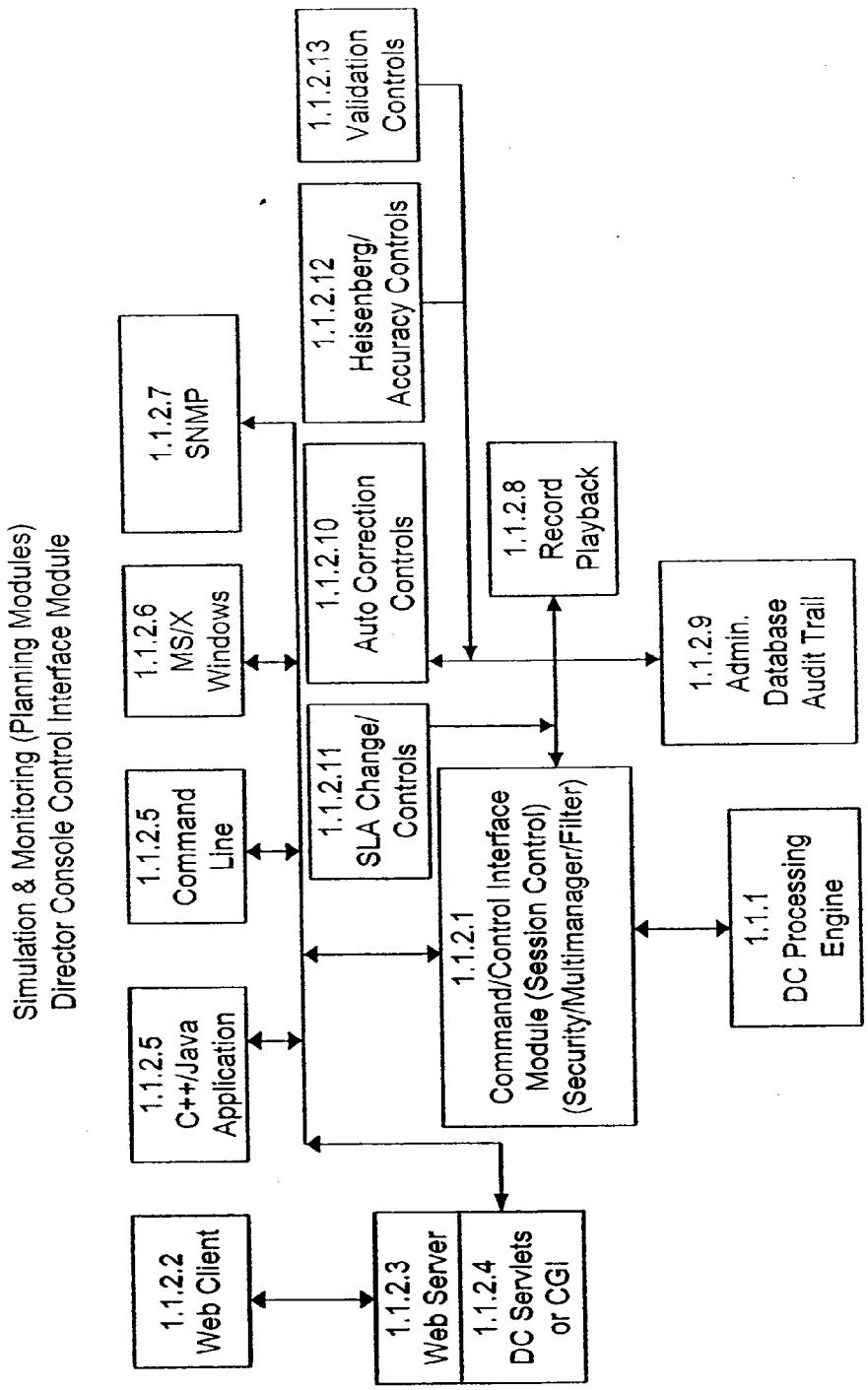
FIG. 17 shows a director console control interface module for the director console of FIG. 9, according to the present invention.
Figure 18:
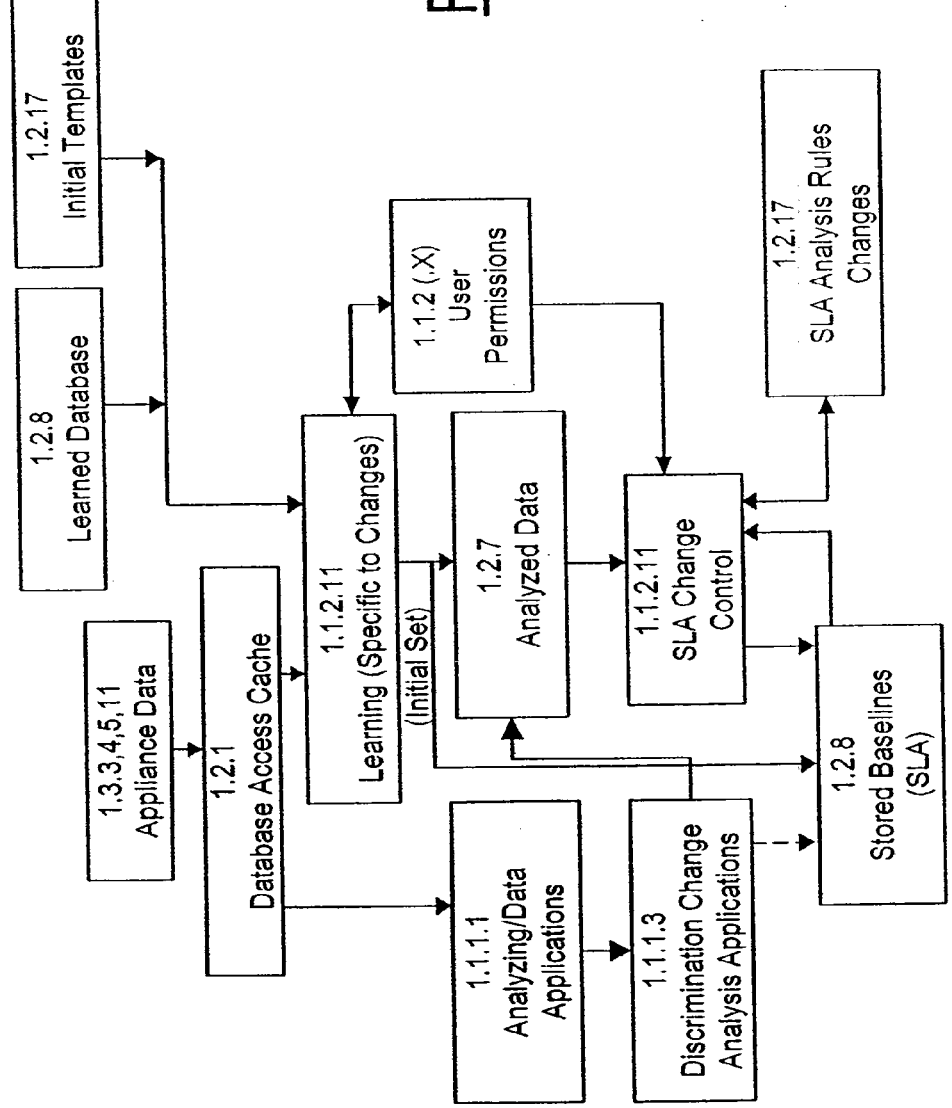
FIG. 18 shows SLA monitoring controls for the director console of FIG. 9, according to the present invention.
Figure 19:
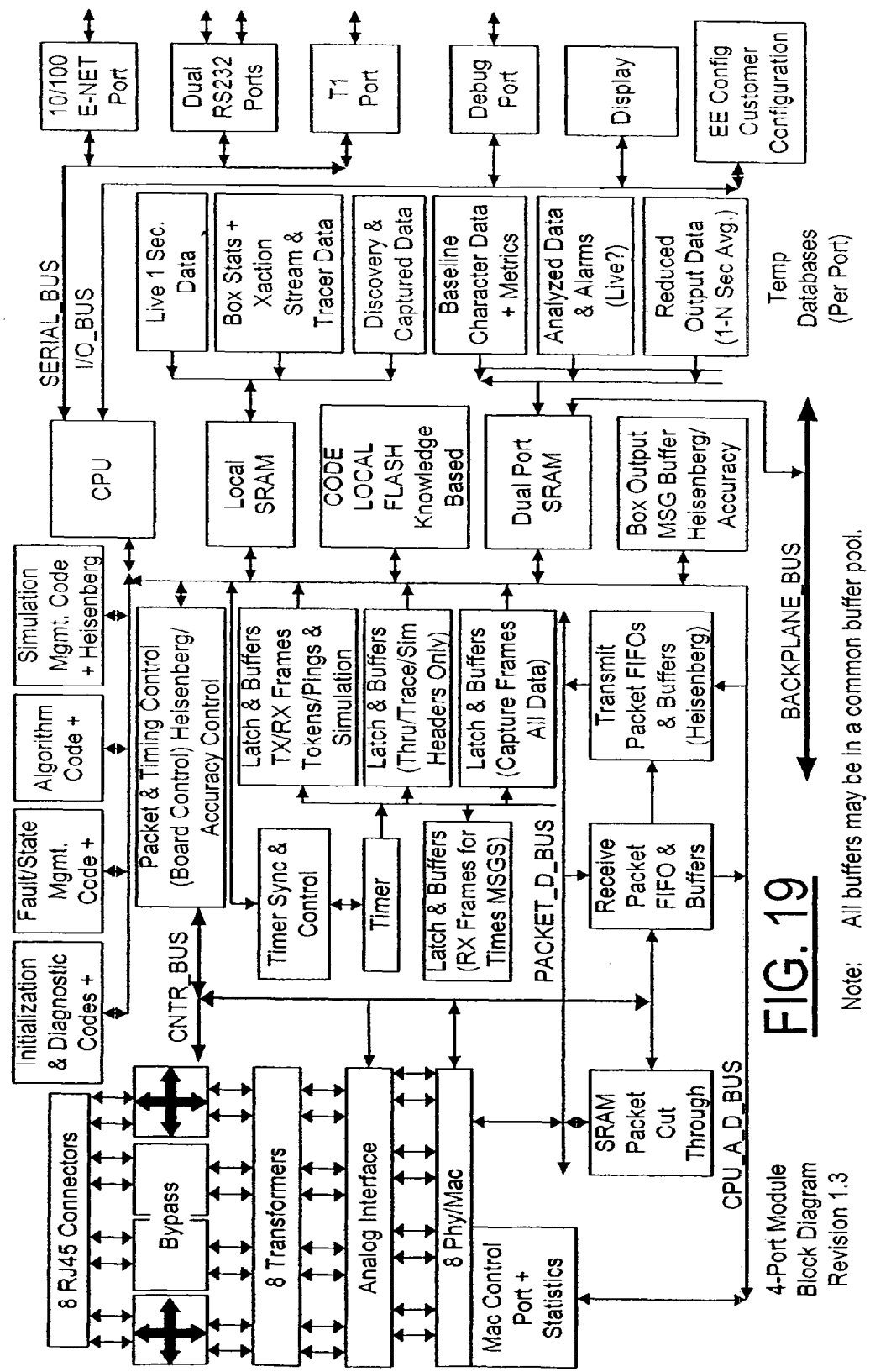
FIG. 19 shows the four-port network module of FIG. 6 with particular emphasis on packet and timing control.
Figure 20:
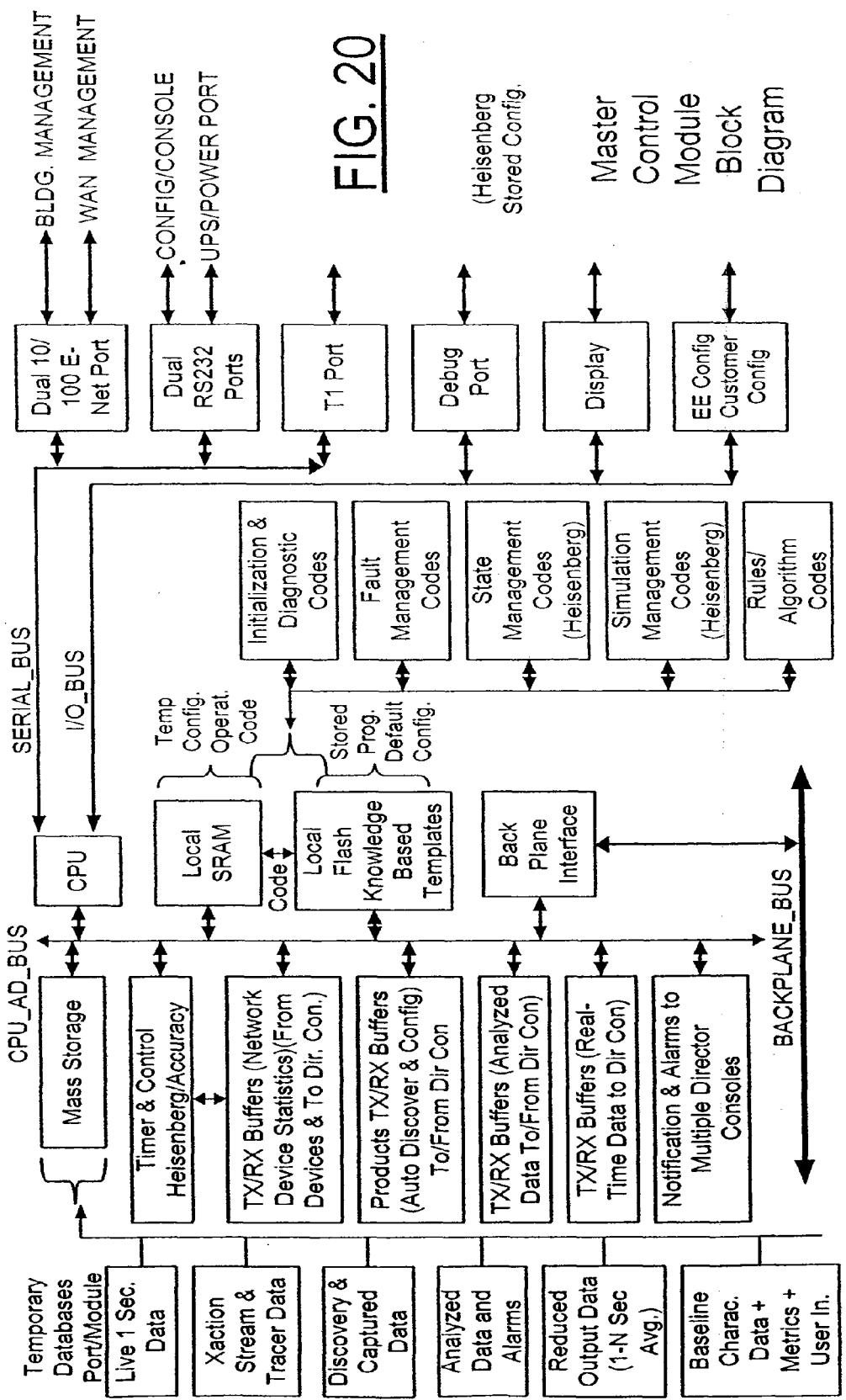
FIG. 20 shows the master control module and should be viewed in conjunction with FIG. 19.

FIG. 15 shows the master control module of FIG. 8 with particular emphasis on simulation and monitoring planning modules of the present invention. FIG. 16 is a block diagram of the four-port module of FIG. 7 illustrating the planning modules including simulation and monitoring used in conjunction with the master control module of FIGS. 9 and 15. FIG. 17 shows the director console control interface module while FIG. 18 shows SLA monitoring controls.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

The invention claimed is:

1. Method for bandwidth management, comprising the steps of an apparatus:
    measuring (16) business bandwidth and providing a current characterized view signal (32) having a magnitude indicative thereof and providing a raw and analyzed data signal (64),
    comparing (30) the current characterized view signal (32) with one or more corresponding baseline signals for providing a discrimination signal (34) and a top-level review signal (68),
    analyzing (36) the discrimination signal for providing a results notification signal (38) and an analyzed data signal,
    performing (70) a simulation analysis in response to the raw and analyzed data signal (64), the top-level review signal (68), the analyzed data signal, the results notification signal (38) and to a state type signal for providing a key data signal, an output signal, and a learning feedback signal (120),
    modifying/tuning business bandwidth auto-learning (114), auto-characterization (116), and partitioning (118) based on said learning feedback signal (120), and
    providing (114, 116, 118) a validation signal (122) for the simulation analysis in response to said business bandwidth modified/tuned based on the learning feedback signal.

2. The method of claim 1, wherein said step of measuring further comprises the steps of said apparatus:
    passively (18) and actively (20) monitoring said business bandwidth in a time-synchronized manner for providing periodic reporting,
    collecting and analyzing (22) said periodic reporting for providing a statistical analysis,
    providing (24) final data indicative of end-to-end and component metrics in response to said statistical analysis, and
    storing (26) said final data for display.

3. The method of claim 1, wherein said steps of comparing (30) and analyzing (36) further comprise the steps of said apparatus:
    comparing (40) said current characterized view signal (32) against a baseline profile for providing a comparison signal (42),
    performing (44) a change analysis in response to said comparison signal (42) for providing a change and relevant data signal (46),
    performing (48) a detailed change analysis in response to said change and relevant data signal, for providing said discrimination signal (34, 50, 52),
    performing (54) a component analysis and performing (56) an impact analysis in response to said discrimination signal, for providing component and impact analysis signals (60, 62), and
    aggregately analyzing (58) said component and impact analysis signals for providing said results notification signal (38).

4. The method of claim 2, wherein said steps of comparing (30) and analyzing (36) further comprise the steps of said apparatus:
    comparing (40) said current characterized view signal (32) against a baseline profile for providing a comparison signal (42), performing (44) a change analysis in response to said comparison signal (42) for providing a change and relevant data signal (46), performing (48) a detailed change analysis in response to said change and relevant data signal, for providing said discrimination signal (34, 50, 52), performing (54) a component analysis and performing (56) an impact analysis in response to said discrimination signal, for providing component and impact analysis signals (60, 62), and aggregately analyzing (58) said component and impact analysis signals for providing said results notification signal (38).

5. The method of claim 1, wherein said steps of performing (70) a simulation analysis further comprise the steps of said apparatus:

performing (100) a run-time analysis of synchronized input from said steps of measuring (16), comparing (30) and analyzing (36) for providing collected and aggregated simulation effect signals (106, 108), analyzing (110) at least one of the simulation effect signals (106) for providing an output effect signal (114), and analyzing (116) the output effect signal (114) for providing a notice-feedback signal (102).

6. The method of claim 5, further comprising the steps of said apparatus:

analyzing and comparing (112) at least one of the simulation effect signals (108) against a prediction signal (96) for providing an input and analyzed data signal (118), analyzing (120) the input and analyzed data signal (118) for providing a current analysis signal (122), and storing (124) the current analysis signal for providing a results signal (104) for display.

7. The method of claim 1, further comprising executing (74) a simulation, comprising said apparatus:

identifying (84) baseline business bandwidth profiles in response to input signals (82) indicative of baseline characterizations from simulation templates (80) for providing user requests, assembling (88) a simulation scenario in response to said user requests for providing translation signals (90), distributing (92) scenario profiles in response to said translation signals for providing an execution signal (98), providing (107) a simulation engine control signal (105) in response to said execution signal (98).

* * * * *